United States Patent
Jeon et al.

(10) Patent No.: US 7,764,047 B2
(45) Date of Patent: Jul. 27, 2010

(54) BATTERY MODULE WITH IMPROVED STRUCTURE, BATTERY CONTACT AND HEAT DISSIPATION

(75) Inventors: Yoon-Cheol Jeon, Suwon-si (KR); Tae-Yong Kim, Suwon-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 391 days.

(21) Appl. No.: 11/798,028

(22) Filed: May 9, 2007

(65) Prior Publication Data

US 2007/0285051 A1 Dec. 13, 2007

(30) Foreign Application Priority Data

Jun. 9, 2006 (KR) ...................... 10-2006-0051953

(51) Int. Cl.
*H01M 10/46* (2006.01)
(52) U.S. Cl. ..................................... 320/112
(58) Field of Classification Search ................. 320/106, 320/107, 112, 116, 150; 429/96, 97, 98, 429/99, 100
See application file for complete search history.

(56) References Cited

U.S. PATENT DOCUMENTS

2006/0115719 A1 6/2006 Jeon et al.
2007/0026306 A1* 2/2007 Lee et al. ..................... 429/160
2007/0037051 A1* 2/2007 Kim et al. .................... 429/151
2007/0141452 A1* 6/2007 Kim ............................ 429/120

FOREIGN PATENT DOCUMENTS

| JP | 2005-108693 | 4/2005 |
| JP | 2005-197179 | 7/2005 |
| KR | 1020050035087 | 4/2005 |

OTHER PUBLICATIONS

Korean Office Action issued by Korean Patent office on Sep. 21, 2009 corresponding to the Korean Patent application No. 10-2006-0051953.

* cited by examiner

*Primary Examiner*—Edward Tso
(74) *Attorney, Agent, or Firm*—Robert E. Bushnell, Esq.

(57) ABSTRACT

A battery module includes a plurality of unit batteries and barriers which are interposed between the unit batteries. The barriers have front surfaces which contact the unit batteries and which are curved to bend elastically. The barriers have side surfaces which interconnect the front surfaces, and which have pathways through which a heat transfer medium flows. Connecting rods and nuts interconnect end plates of the battery module so as to press the unit batteries and the barriers together.

17 Claims, 6 Drawing Sheets

BATTERY MODULE WITH IMPROVED STRUCTURE, BATTERY CONTACT AND HEAT DISSIPATION

CLAIM OF PRIORITY

This application makes reference to, incorporates the same herein, and claims all benefits accruing under 35 U.S.C. §119 from an application for SECONDARY BATTERY MODULE earlier filed in the Korean Intellectual Property Office on the 9$^{th}$ of Jun. 2006 and there duly assigned Serial No. 10-2006-0051953.

BACKGROUND OF THE INVENTION

1. Field of the Invention

The present invention relates to a battery module which is constituted by stacking a plurality of unit batteries, and more particularly, to a battery module in which the structure of a barrier interposed between unit batteries is improved.

2. Description of the Related Art

Generally, a rechargeable battery can be discharged and then charged, unlike a primary battery which is not intended to be charged.

A low capacity battery constructed with a packed battery cell is used for a portable small-sized electronic device such as a mobile phone, a laptop computer, and a camcorder. A high capacity battery constructed with tens of battery cells which are connected has been widely used as a motor driving power source of a hybrid electric vehicle (HEV).

The rechargeable battery is manufactured in various shapes. A representative rechargeable battery may be in the form of a can-type battery or a prismatic battery.

The high capacity rechargeable battery used to drive a motor of an apparatus requiring a large amount of power, such as an electric vehicle, is constructed by connecting a plurality of high output rechargeable batteries in series.

Hereinafter, for the convenience of description, the high output rechargeable battery is denoted as a unit battery, and the high capacity rechargeable battery constructed with a plurality of electrically connected unit batteries is denoted as a battery module.

Each of the unit batteries includes an electrode assembly having positive and negative electrodes with a separator interposed therebetween, a casing having a space wherein the electrode assembly is accommodated, and a cap assembly which is engaged with the casing so as to seal the casing.

A plurality of the unit batteries are stacked in order to constitute a battery module.

Conventionally, barriers are interposed between the stacked unit batteries, and the stacked unit batteries are pressed together with a proper tightening pressure by using end plates disposed outside the stacked unit batteries, thereby assembling a single battery module.

However, in the conventional structure, the tightening pressure of the end plates is not uniformly applied to the stacked unit batteries. More specifically, a unit battery disposed at the center of the stacked unit batteries does not receive a properly applied pressing force, whereas a unit battery contacting the end plate does receive a properly applied pressing force.

In addition, the conventional battery module has a problem in that the tightening pressure applied to the unit batteries becomes loosened and irregular as time goes on.

More specifically, during the use of the unit batteries, a swelling phenomenon occurs in that the battery casing is swollen by gas generated by a chemical reaction inside the battery. As described above, due to the swelling phenomenon, the battery becomes deformed, for example, the battery casing becomes swollen. In addition, deformation energy of the battery may press the barrier or the end plate which is used to fix the unit batteries in the battery module so as to cause deformation.

The deformation of the unit batteries and the barrier affects contact characteristics between the unit batteries and the barriers, so that the unit batteries and the barriers cannot properly contact each other. Accordingly, heat transfer from the unit battery to the barrier is not properly performed, so that heat dissipation efficiency decreases.

In addition, it is reported that output efficiency of batteries is improved when a battery module is assembled by applying a predetermined tightening pressure to unit batteries. However, in the conventional structure, the tightening pressure applied by the barrier changes or reduces as time goes on. Therefore, there is a problem in that efficiency of the battery decreases.

SUMMARY OF THE INVENTION

The present invention provides a battery module capable of applying a uniform tightening pressure to unit batteries.

In addition, the present invention also provides a battery module capable of improving contact characteristics between unit batteries and barriers.

Furthermore, the present invention provides a battery module capable of preventing poor contact due to deformation of unit batteries and the barriers.

According to an aspect of the present invention, a battery module includes a plurality of unit batteries, and barriers interposed between the unit batteries.

The barriers have a structure in which front surfaces thereof closely contact the unit batteries and are curved so as to bend elastically.

Accordingly, although pressure for pressing the unit batteries together is reduced, the barriers can remain continuously in close contact with the unit batteries due to an elastic restoring force.

The battery module is constricted with a plurality of unit batteries which are stacked, and which are sequentially disposed at predetermined intervals, and with barriers interposed between the unit batteries, thereby constituting a battery set.

The battery set closely contacts a pair of end plates. More specifically, the pair of end plates are closely contacted by outer surfaces of the outermost unit batteries of the unit battery set. Thereafter, connecting rods for connecting the end plates and nuts for tightening distal ends of the connecting rods are tightened, so that the battery set is fixed.

In this case, the barrier is formed so as to have a rectangular parallelepiped shaped structure, in which openings are formed at both ends and the front surfaces thereof are curved convexly so that the front surfaces are elastically pressed by the unit batteries when the barriers are pressed by the unit batteries.

Therefore, in the process of closely contacting the barriers and the unit batteries, the front surfaces protruding from the width of the side surfaces of the barriers are pressed by the unit batteries and are elastically bent so as to continuously exert an elastic restoring force on the unit batteries.

The front surfaces of the barrier may be curved in the shape of an arc having a gentle radius of curvature. In addition, the radius of curvature of the front surfaces is not limited.

Furthermore, the barrier may be made of a material having a good heat transfer rate as well as an elasticity.

In addition, both side surfaces of the barrier may be provided with pathways which are disposed at predetermined intervals, and through which heat is transferred. Therefore, the heat transfer medium flows through the pathways.

The battery module may be constructed so as to allow the heat transfer medium to flow through the openings formed at both ends of the barrier.

In addition, at least one of the front surfaces of the barrier contacting the unit batteries may be provided with a plurality of holes.

Sizes or shapes of the holes are not limited.

In addition, at least one of the front surfaces of the barrier contacting the unit batteries may be provided with long slits extending toward the side surfaces.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention will be described in detail with reference to the attached drawings so that the present invention can be easily put into practice by those skilled in the art. However, the present invention is not limited to the exemplary embodiments, but may be embodied in various forms.

In the following description, a case where air is used as the heat transfer medium for cooling a battery module is exemplified.

Figure 1:
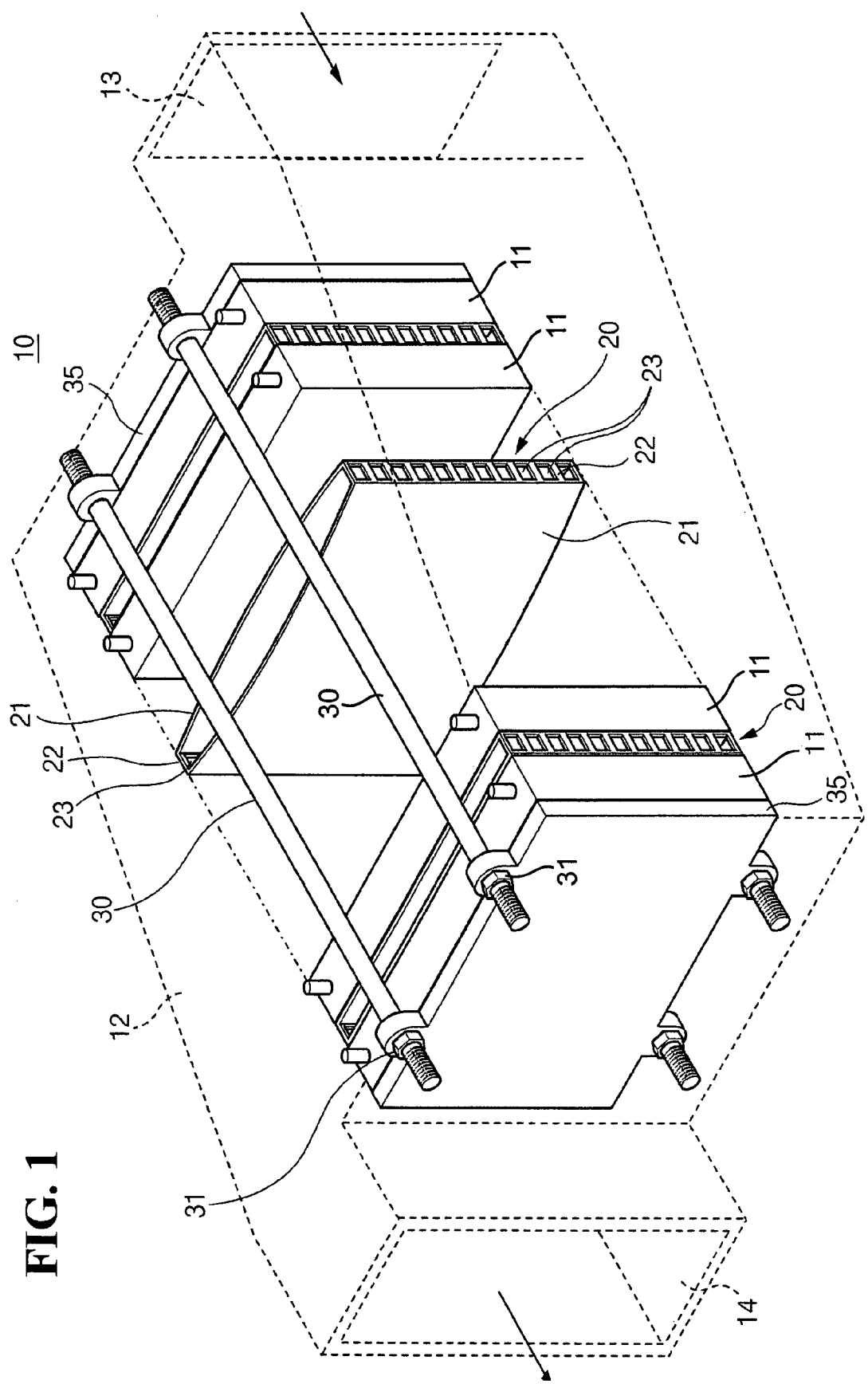
FIG. 1 is a schematic view showing the structure of a battery module according to an embodiment of the present invention.
Figure 2:
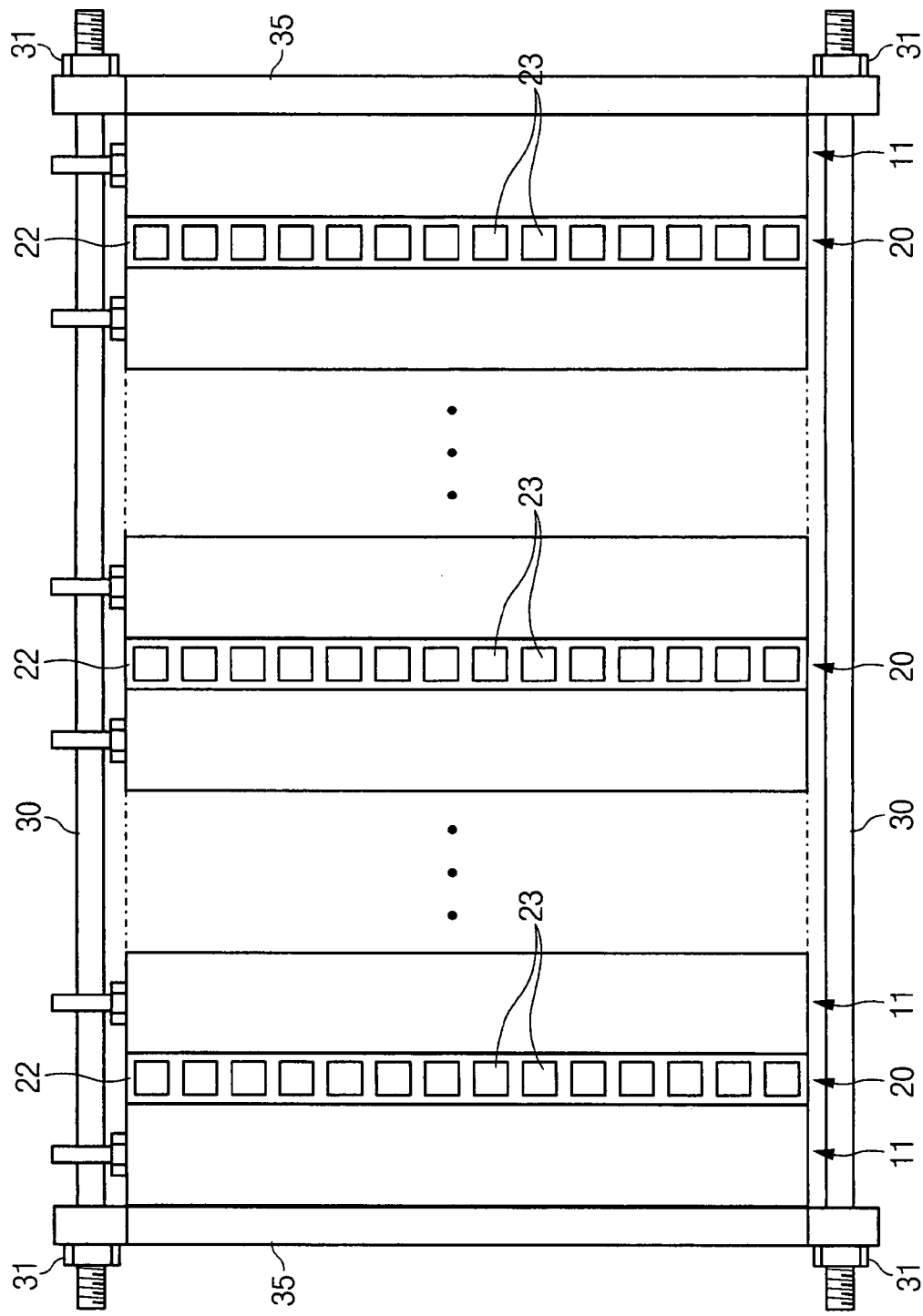
FIG. 2 is a side view showing a state in which barriers are assembled between unit batteries according to an embodiment of the present invention.
Figure 3:
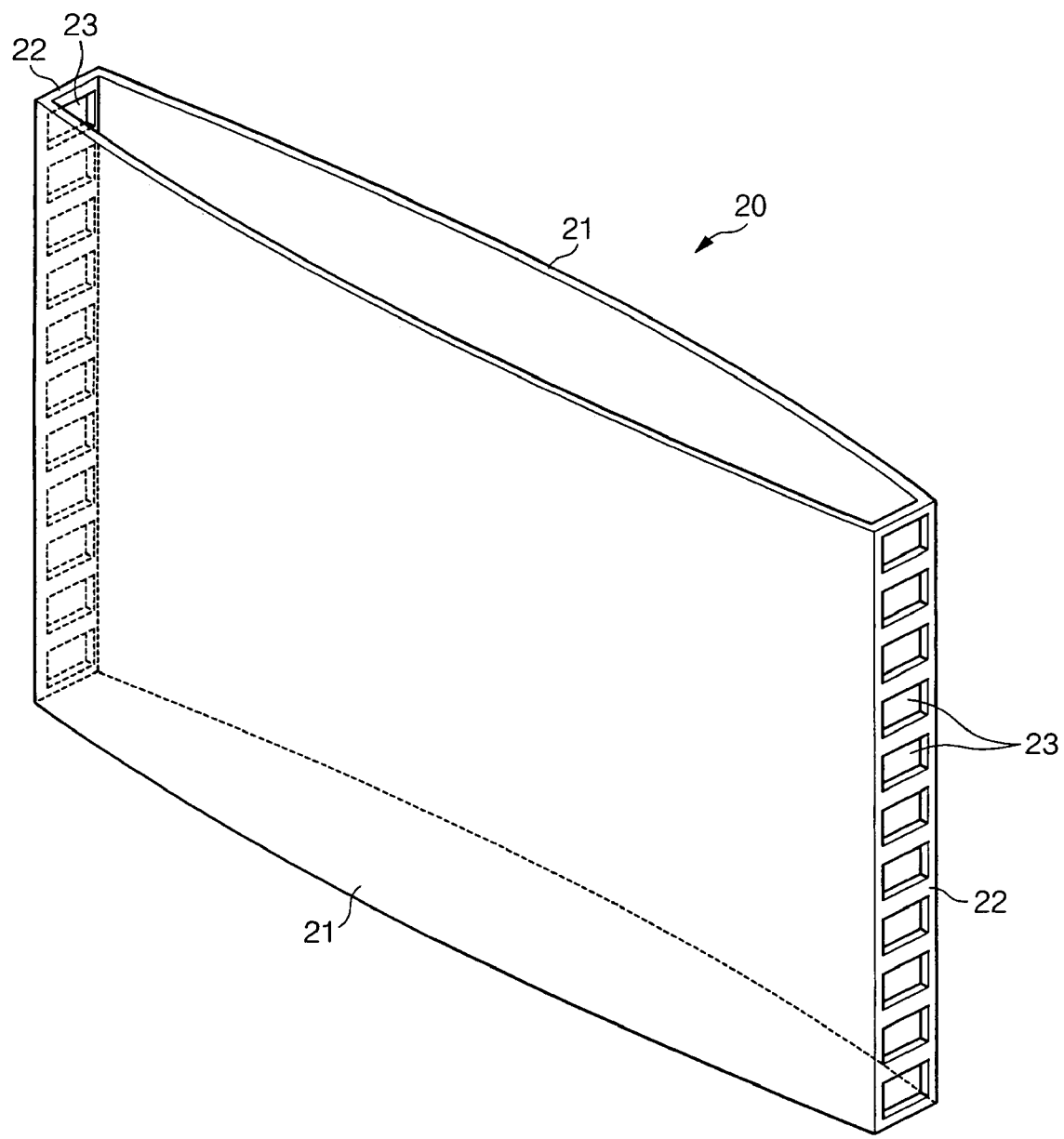
FIG. 3 is a perspective view showing a barrier of a battery module according to an embodiment of the present invention.

FIG. 1 is a schematic view showing the structure of a battery module according to an embodiment of the present invention; FIG. 2 is a side view showing a state in which barriers are assembled between unit batteries according to an embodiment of the present invention; and FIG. 3 is a perspective view showing a barrier of a battery module according to an embodiment of the present invention.

Referring to FIG. 1, battery module 10 is a high capacity battery module and includes a plurality of unit batteries 11 which are sequentially disposed at predetermined intervals.

Hereinafter, in the embodiment, the case wherein prismatic unit batteries are used as the unit batteries 11 is exemplified.

Each of the unit batteries 11 is constructed with a prismatic case accommodating an electrode assembly, including positive and negative electrodes, and a separator interposed therebetween, thereby constituting a rechargeable battery which is charged or discharged with a predetermined amount of power and which has a conventional structure. Barriers 20 are interposed between the unit batteries 11 in order to maintain intervals between the unit batteries 11 so that air can be circulated between the unit batteries 11 to cool the unit batteries generating heat.

Therefore, according to the embodiment, the unit batteries 11 are sequentially stacked at predetermined intervals, and the barriers 20 are interposed between the unit batteries 11, thereby constituting a battery set of the battery module 10.

The battery set is closely contacted by a pair of end plates 35. More specifically, the end plates 35 are closely contacted with outer surfaces of the outermost unit batteries of the unit batteries 11 constituting the battery set. Thereafter, connecting rods 30 are provided to connect the end plates 35, and nuts 31 for tightening distal ends of the connecting rods 30 are tightened, so that the battery set is pressed and fixed at a predetermined pressure.

In addition, a housing 12 for accommodating the battery set is provided, at an end portion thereof, with an inlet 13 through which air for temperature control (that is, used to control temperature) of the unit batteries 11 flows, and the battery set is also provided, at another end portion thereof, with an outlet 14 through which air passing the unit batteries 11 is discharged.

Accordingly, the air for temperature control flows into the housing 12 through the inlet 13 and passes the barriers 20 between the unit batteries 11. In the meantime, heat generated by the unit batteries 11 is exchanged with the air, and the heat exchanged air is discharged through the outlet 14 disposed at the other end portion of the housing 12.

The structure of the housing 12, the positions of the inlet 13 and the outlet 14, and the arrangement of the unit batteries 11 inside the housing 12 are not limited to the disclosed embodiment, and may be varied as long as the structure permits.

In the battery module 10 having the aforementioned construction, the barriers 20 of the disclosed embodiment are rectangular-shaped structures, each having a size similar to that of the unit battery 11, and each having openings at both ends and four surfaces.

Hereinafter, for the convenience of description, referring to the four surfaces of the barrier 20, wide areas contacting the unit battery 11 are denoted as front surfaces 21, and surfaces between the two front surfaces 21 are denoted as side surfaces 22.

Both side surfaces 22 of the barrier 20 are provided with pathways 23 through which cooling air flows. The pathways 23 are formed at predetermined intervals, and the positions of the pathways 23 in one side surface of the barriers 20 correspond to those in the other side surface thereof. Both front surfaces 21 are curved outwardly so as to bend elastically.

Accordingly, when an external force is not applied, the barrier 20 has substantially the shape of an ellipse, and the front surfaces 21 of the barrier 20 are pressed so as to have a rectangular shape.

Both front surfaces 21 of the barrier 20 have structures which correspond to each other.

In addition, the barriers 20 may be made of a material having a good elastic restoring capability. Furthermore, the barriers 20 may be made of a material having a high heat transfer rate. For example, the barriers 20 may be made of iron, aluminum, copper, or an alloy having a good elasticity.

The barriers 20 are stacked between the unit batteries 11 while the side surfaces 22 thereof are disposed in such a direction that air is circulated through the side surfaces 22. In addition, the barriers 20 are pressed by the end plates 35 at both sides of the battery set so as to closely contact the unit batteries 11.

In the meantime, the convex front surfaces 21 of the barrier 20 are pressed by the unit batteries 11 so as to apply an elastic force to the unit batteries 11. Operation of the barriers 20 will be described in further detail below.

Air flowing into the housing 12 is properly circulated through the pathways 23 formed in the side surfaces 22 of the barriers 20.

In the embodiment, a structure in which the pathways 23 formed in the side surfaces 22 are used as flowpaths for the air is exemplified. However, along with that structure, a structure in which openings formed at the both ends of the barriers 20 are used as the flowpaths for the air may be employed.

In the structure, while the operation of the front surfaces 21 are maintained, the air can be more properly circulated through openings 23 formed in both ends of the barrier 20.

Figure 4:
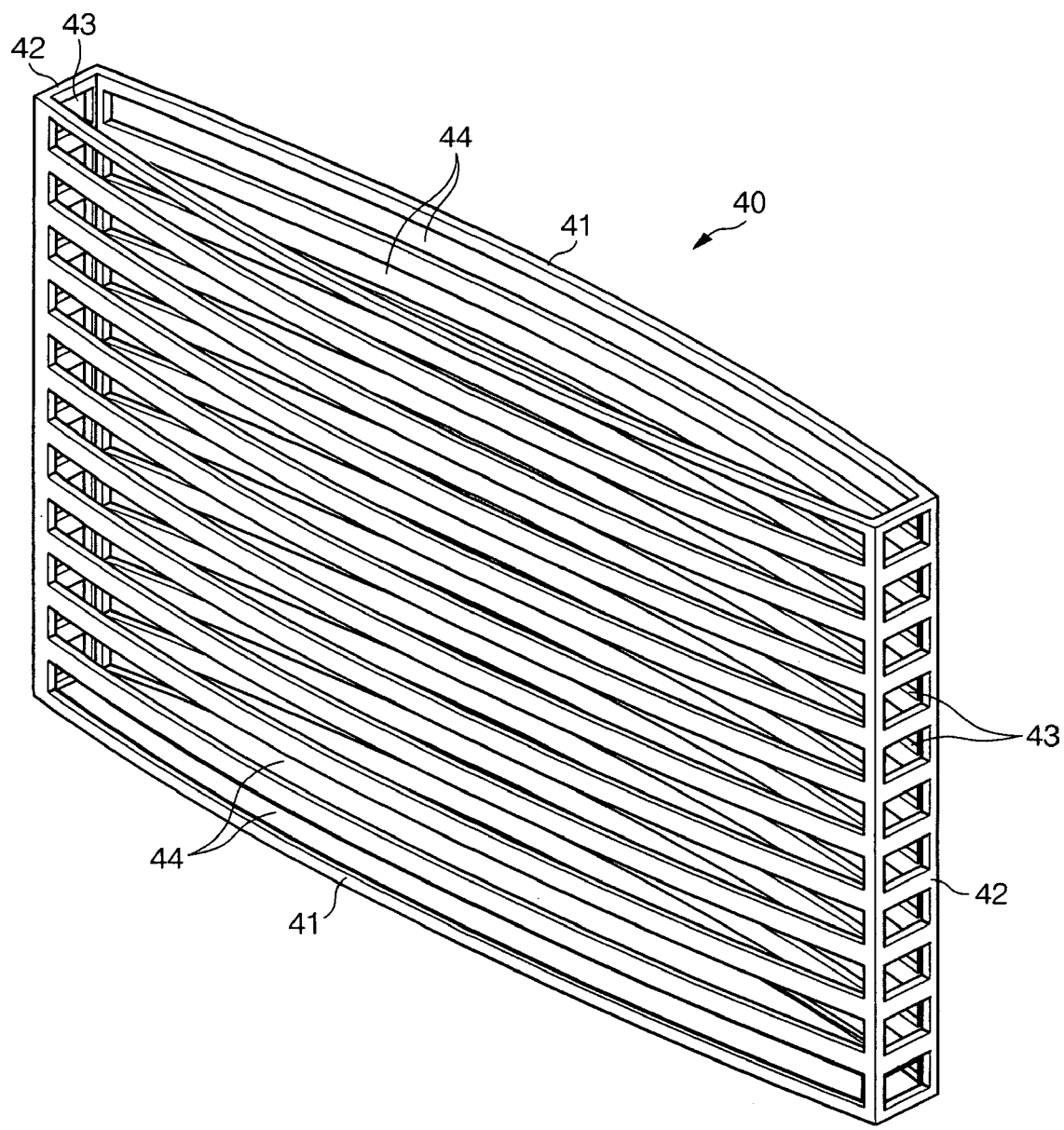
FIGS. 4 and 5 are perspective views showing barriers of a battery module according to another embodiment of the present invention.
Figure 5:
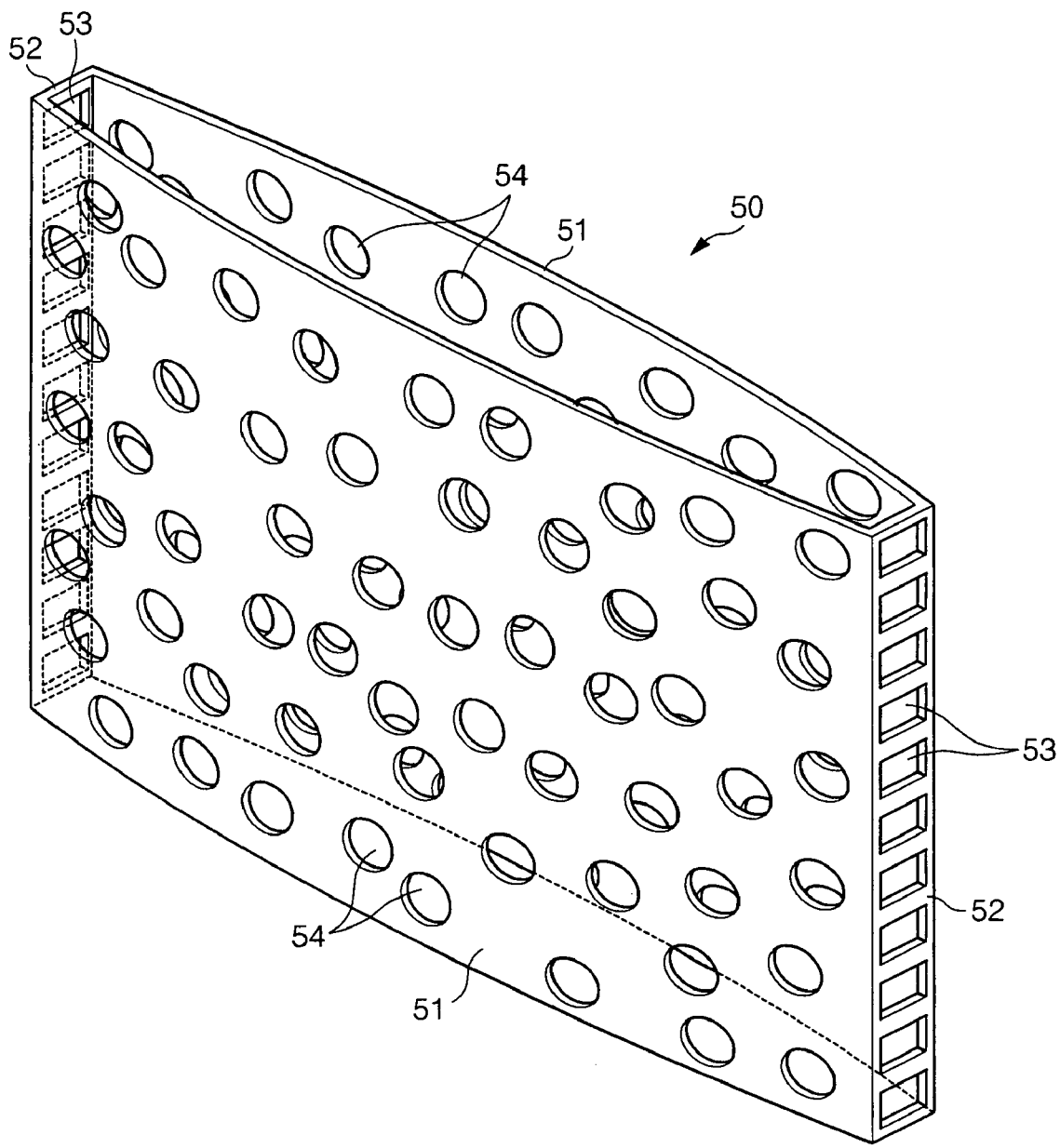

FIGS. 4 and 5 are perspective views showing barriers of a battery module according to another embodiment of the present invention.

The barrier 40 according to the embodiment of FIG. 4 is a rectangular shaped structure having a size similar to that of the unit battery 11, and having openings at both ends and four surfaces, two front surfaces 41 and two side surfaces 42.

Specifically, both side surfaces 42 of the barrier 40 are provided with pathways 43 through which cooling air flows. The pathways 43 are formed at predetermined intervals, and the positions of the pathways 43 in one side surface 42 correspond to those in the other side surface 42

Both front surfaces 41 are curved outwardly so as to bend elastically. In addition, slits 44 are formed at predetermined intervals in both front surfaces 41.

In this embodiment, the slits 44 have a rectangular shape, and when the barrier 40 stands so that the side surfaces 42 are vertical, the slits 44 extend in a horizontal direction toward both side surfaces 42.

The barrier 50 according to the embodiment of FIG. 5 includes side surfaces 52 and front surfaces 51 in a manner similar to the barrier 40 of FIG. 4. The side surfaces 52 are provided with pathways 53, and the front surfaces 51 are curved outwardly. The front surfaces 51 are provided with a plurality of holes 54 having a circular shape instead of slits. The sizes of the holes 54 are not limited The holes 54 may be formed so as to have the shape of an ellipse or a polygon instead of the shape of a circle.

In addition, the holes 54 may be formed in a regular array at predetermined intervals, or may be formed irregularly.

The outer surfaces of the unit batteries 11 contacting the barriers 40 or 50 are exposed through the slits 44 or the holes 54, respectively, formed in the front surfaces 41 or 51, respectively, of the barriers 40 or 50, respectively, in the aforementioned embodiments.

Therefore, the cooling air circulated inside the barriers 40 or 50 can directly contact the outer surface of the unit batteries 11 through the silts 44 or holes 54, respectively, so that cooling efficiency of the unit battery 11 increases.

Figure 6:
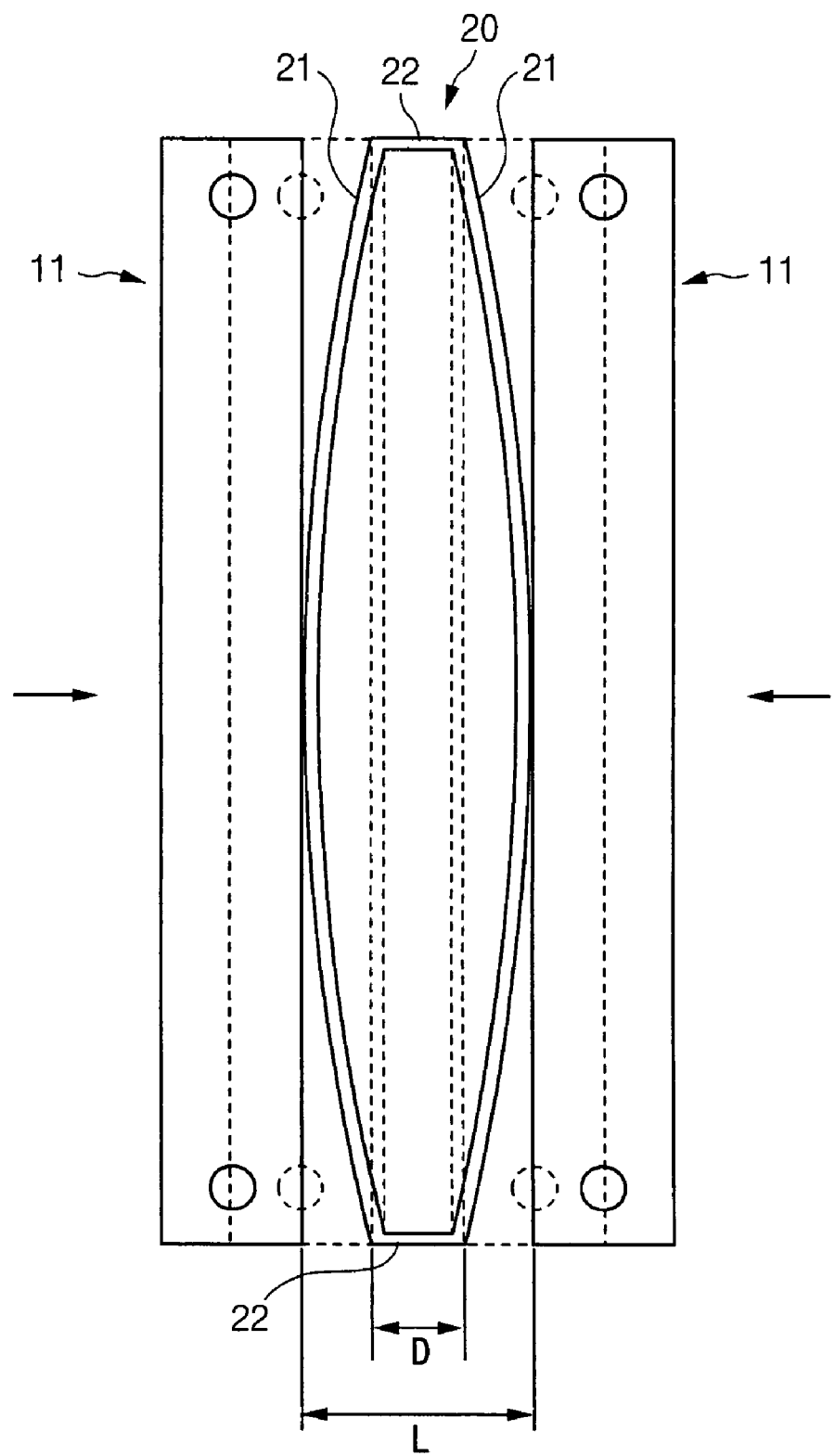
FIG. 6 is a schematic plan view for explaining the operation of a barrier according to an embodiment of the present invention.

FIG. 6 is a schematic plan view for explaining the operation of a barrier according to an embodiment of the present invention.

Hereinafter, the operation of the barriers 20 is described with reference to FIGS. 2 and 6.

When the unit batteries 11 and the barriers 20 are not pressed by the end plates 35, the front surfaces 21 of the barriers 20 are curved outwardly so that the outer surfaces of the unit batteries 11 are not contacted by the entirety of the front surfaces 21.

In this state, when the connecting rods 30 and the nuts 31 are tightened so that the end plates 35 press the unit batteries 11, the barriers 20 are pressed by the unit batteries 11 facing the front surfaces 21 of the barriers 20.

Thereafter, as the end plates 35 continue to press the unit batteries 11, the front surfaces 21 of the barriers 20 are pressed by the unit batteries 11, so that the convex front surfaces 21 are flattened.

More specifically, as shown in FIG. 6, as the barrier 20 is pressed by the unit batteries 11, an initial width L of the barrier 20 is gradually reduced and becomes a width D which is the width of the side surface 22 of the barrier 20. In the meantime, elastic restoring force is exerted on the front surfaces 21.

As described above, since the centers of the front surfaces 21 of the barriers 20 protrude by (L-D)/2 from the side surfaces 21 having the width D of the barriers 20, when the unit batteries 11 are pressed by the end plates 35, the front surfaces 21 are pressed inwardly by the protruding width so as to exert the elastic restoring force.

The aforementioned operation continues until the unit batteries 11 are contacted by the side surfaces 22 of the barriers 20 so as to entirely flatten the front surfaces 21 of the barriers 20.

Referring back to FIG. 2, that figure is more specifically a side view showing the battery set in which the unit batteries 11 and the barriers 20 are pressed by the end plates 35, and the figure illustrates a state in which the front surfaces 21 of the barriers 20 are pressed by the unit batteries 11 so as to be entirely flattened.

As described above, when the unit batteries 11 are pressed by the end plates 35 at a predetermined pressure, an elastic restoring force is generated by the front surfaces 21 of the barriers 20, so that the barriers 20 continuously exert an elastic force on the unit batteries 11. Thereafter, the barriers 20 interposed between the unit batteries 11 are elastically contacted by the unit batteries 11.

Therefore, although intervals between the unit batteries 11 irregularly change due to deterioration of the unit batteries 11 or the end plates 35, the front surfaces 21 of the barriers 20 continuously exert the elastic restoring force on the unit batteries 11. Thus, changes in intervals between the unit batteries 11 can be compensated. Accordingly, a state in which the barriers 20 elastically contact the side surfaces of the unit batteries 11 is maintained.

The battery module according to the present invention may be used as an energy source for driving a motor of an apparatus, the apparatus being (for example) a hybrid electric vehicle (HEV), an electric vehicle (EV), a wireless vacuum cleaner, an electric bicycle, or an electric scooter.

According to the embodiments, changes in intervals between the unit batteries due to a deformation of the battery module can be compensated so that the barriers can remain in close contact with the unit batteries. Therefore, heat dissipation efficiency does not decrease.

In addition, a uniform pressure can be continuously applied to the unit batteries so that output efficiency of the battery module increases.

In addition, although deterioration occurs, poor contact between the unit batteries and the barriers is prevented. Therefore, reliability and stability of the battery increase.

Although exemplary embodiments and the modified examples of the present invention have been described, the present invention is not limited to the disclosed embodiments and examples, but may be modified in various ways without departing from the scope of the invention as defined by the appended claims, the detailed description, and the accompanying drawings. Therefore, it is natural that such modifications will fall within the scope of the present invention.

What is claimed is:

1. A battery module, comprising:
   a plurality of unit batteries; and
   barriers interposed between the unit batteries;
   wherein each of said barriers has two front surfaces, each front surface contacting a corresponding one of two adjacent unit batteries, said each front surface being convexly curved toward said corresponding one of the two adjacent unit batteries and said each front surface bending elastically.

2. The battery module of claim 1, wherein the unit batteries and the barriers are alternately stacked to constitute a battery set; and
   wherein outermost sides of the battery set are closely contacted by respective end plates.

3. The battery module of claim 2, further comprising connecting rods and nuts, wherein the end plates are fixed by tightening the connecting rods and nuts, thereby fixing the battery set.

4. A battery module, comprising:
   a plurality of unit batteries; and
   barriers interposed between the unit batteries;
   the unit batteries and the barriers being alternately stacked to constitute a battery set;
   outermost sides of the battery set being closely contacted by corresponding end plates; and
   each of said barriers having two front surfaces, each front surface contacting a corresponding one of two adjacent unit batteries, said each front surfaces surface being convexly curved toward said corresponding one of the two adjacent unit batteries, and said each front surface bending elastically;
   said battery module further comprising connecting rods and nuts, wherein the end plates are fixed by tightening the connecting rods and nuts, thereby fixing the battery set.

5. The battery module of claim 1, wherein the unit batteries are prismatic.

6. The battery module of claim 1, wherein the barriers are rectangular shaped structures, and said barriers have side surfaces interconnecting the front surfaces and openings formed in at least one of the front surfaces and the side surfaces.

7. The battery module of claim 6, wherein the side surfaces of the barriers are provided with pathways through which a heat transfer medium flows.

8. The battery module of claim 6, wherein the openings of the barriers form flowpaths for a heat transfer medium.

9. A battery module, comprising:
   a plurality of unit batteries; and
   barriers interposed between the unit batteries;
   wherein each of said barriers has two front surfaces, each front surface contacting a corresponding one of two adjacent unit batteries; and
   wherein at least one of the two front surfaces of said each of the barriers is provided with a plurality of openings.

10. The battery module of claim 9, wherein the openings comprise holes which have a circular shape.

11. The battery module of claim 9, wherein the openings comprise slits.

12. The battery module of claim 11, wherein the slits extend toward side surfaces of said each of the barriers.

13. The battery module of claim 12, wherein the side surfaces interconnect the front surfaces of the barriers.

14. The battery module of claim 1, wherein the barriers have side surfaces interconnecting the front surfaces.

15. The battery module of claim 14, wherein openings are formed in the side surfaces so as to provide pathways through which a heat transfer medium flows.

16. The battery module of claim 15, wherein openings are formed in the front surfaces.

17. The battery module of claim 16, wherein the openings comprise at least one of holes and slits.

* * * * *